United States Patent [19]

Fox et al.

[11] Patent Number: 4,577,947

[45] Date of Patent: Mar. 25, 1986

[54] FILM MAGAZINE

[75] Inventors: Anthony G. Fox, Signal Mountain; Harry L. O. Smith, Cleveland; Ehsan Sadre-Marandi, Chattanooga, all of Tenn.

[73] Assignee: Beattie Systems, Inc., Cleveland, Tenn.

[21] Appl. No.: 705,141

[22] Filed: Feb. 25, 1985

[51] Int. Cl.⁴ .............................................. G03B 17/26
[52] U.S. Cl. .................................... 354/275; 242/71.2
[58] Field of Search ................... 354/211, 275; 352/72, 352/78 R; 242/71, 71.1, 71.2, 71.7, 197

[56] References Cited

U.S. PATENT DOCUMENTS

| | | | |
|---|---|---|---|
| 1,424,816 | 8/1922 | Grillone | 242/71.1 |
| 2,153,573 | 4/1939 | Kinloch | 242/71.1 |
| 2,219,722 | 10/1940 | Lloyd | 242/71.7 |
| 2,545,196 | 3/1951 | Curioni | 354/211 |

*Primary Examiner*—L. T. Hix
*Assistant Examiner*—Brian W. Brown
*Attorney, Agent, or Firm*—Alan Ruderman

[57] ABSTRACT

A film magazine for cameras which may be loaded with a long roll of film on the supply spool and which may wind the film into shorter length units into a cassette or the like on the take-up spool when desired for removal of the cassette from the magazine without exposing the film remaining on the supply spool. The magazine includes a container in which the supply spool and take-up spool is mounted and a second housing is fastened in the container and disposed about the take-up spool. A light trap in the second housing permits film to travel in the path from the supply spool to the take-up spool. A cover closes the container against the admission of light while film is disposed therein, and the cover has a port providing access into the second housing. A closure member may be selectively disposed within the port and may be secured to the housing to close the take-up spool from admission of light and to permit removal of the take-up spool without removing the cover. When less than a full long roll of film is expected to be used an empty cassette may be inserted onto the take-up spool and the leading edge of the film attached thereto, and after the desired number of frames are photographically exposed the closure member may be removed, the film in the second housing cut to permit removal of the cassette, and another cassette inserted therein.

17 Claims, 5 Drawing Figures

FILM MAGAZINE

BACKGROUND OF THE INVENTION

This invention relates to film magazines for cameras and more particularly to a film magazine in which long roll film loaded onto the supply spool may be taken up into short roll cassettes when desired, which may be removed from the magazine without exposing the remainder of the roll.

In the photographic art certain cameras, such as those used by professionals for studio and similar posed photographic environments in which a multitude of photographs are taken daily, utilize long roll film in the order of 100 feet in length. Typically such rolls will produce from 500 to 1800 frames, depending upon the negative size. The primary advantage of using film in such lengths is economy, i.e., film purchased in large lengths is substantially less expensive than shorter length rolls and cassettes. There is the additional advantage of convenience where a large number of pictures are going to be taken in a relatively short time. However, although large studios generally process the film themselves, there is a growing number of smaller studios which associate with rapid processing photographic laboratories, i.e., the so-called "mini-labs" which cannot process long rolls of film. Moreover, there are many applications of repetitive photography where the number of photographs taken in any sequence is uncertain. Under such circumstances the use of long roll film becomes a disadvantage since the used portion of the film must be separated from the unused portion in a "black" changebag to preclude light from destroying the film. Of course in a laboratory the film may be removed from the magazine under controlled circumstances, but when this is to be accomplished outside the laboratory, great difficulty and inconvenience occurs if only a limited number of frames of the roll have been used.

SUMMARY OF THE INVENTION

Consequently, it is a primary object of the present invention to provide a film magazine for cameras in which a long roll of film may be loaded on a supply spool and may be taken-up into short roll cassettes which may thereafter be removed from the magazine under a daylight environment.

It is another object of the present invention to provide a film magazine for cameras which may be loaded with economical long roll film on a supply spool while permitting the film to be taken-up after photographic exposure in shorter length strips which may be removed from the magazine under daylight conditions without exposing the unused remaining film of the long roll.

Accordingly, the present invention provides a film magazine for cameras which may be loaded with a long roll of film, such as 100 feet, on the supply spool and which may wind the film into shorter length units into a cassette or the like on the take-up spool, the magazine having means for selectively isolating the take-up spool section of the magazine from the supply spool section to prevent transmission of light from the take-up section to the supply section thereby permitting access into the take-up section for removing the cassette without exposing the film remaining in the supply section. In this manner a number of photographic frames less than a total number of frames on the supply roll may be shot and taken up into a casssette, which may thereafter be removed without exposing the frames remaining on the supply spool.

To this end the invention provides a film magazine comprising a main housing defining a container for mounting the supply and take-up spools and the aperture plate therebetween across which the film travels, and a cover for the container, and additionally the magazine container has a second housing disposed about the take-up spool, the second housing having a light trap through which the film may travel in its path to the take-up spool, and the cover is provided with a port providing access into the second housing while preventing light from entering the remainder of the magazine container, and a closure member disposed within the port and sealingly engagable with the second housing to prevent light transmission into the second housing when closed.

With this construction the cover for the container may be removed for inserting a long roll of film onto the supply spool as usual in a darkened room, and when it is expected that less than the full roll of film is to be photographically exposed, an empty conventional cassette may be inserted onto the take-up spool and a lead of film may be attached thereto. The cover is then closed and the closure member is positioned in the access port and secured to the second housing. The photographically exposed frames of film are taken-up into the cassette and after the desired number exposures are made, the closure member may be removed under daylight conditions, the film between the light trap and the cassette cut, and the cassette removed. Another cassette may thereafter be mounted on the take-up spool and the leading edge of film within the second housing attached to a lead of a new cassette. The closure member may thereafter be attached to the second housing and other frames of film may thereafter be photograpically exposed.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
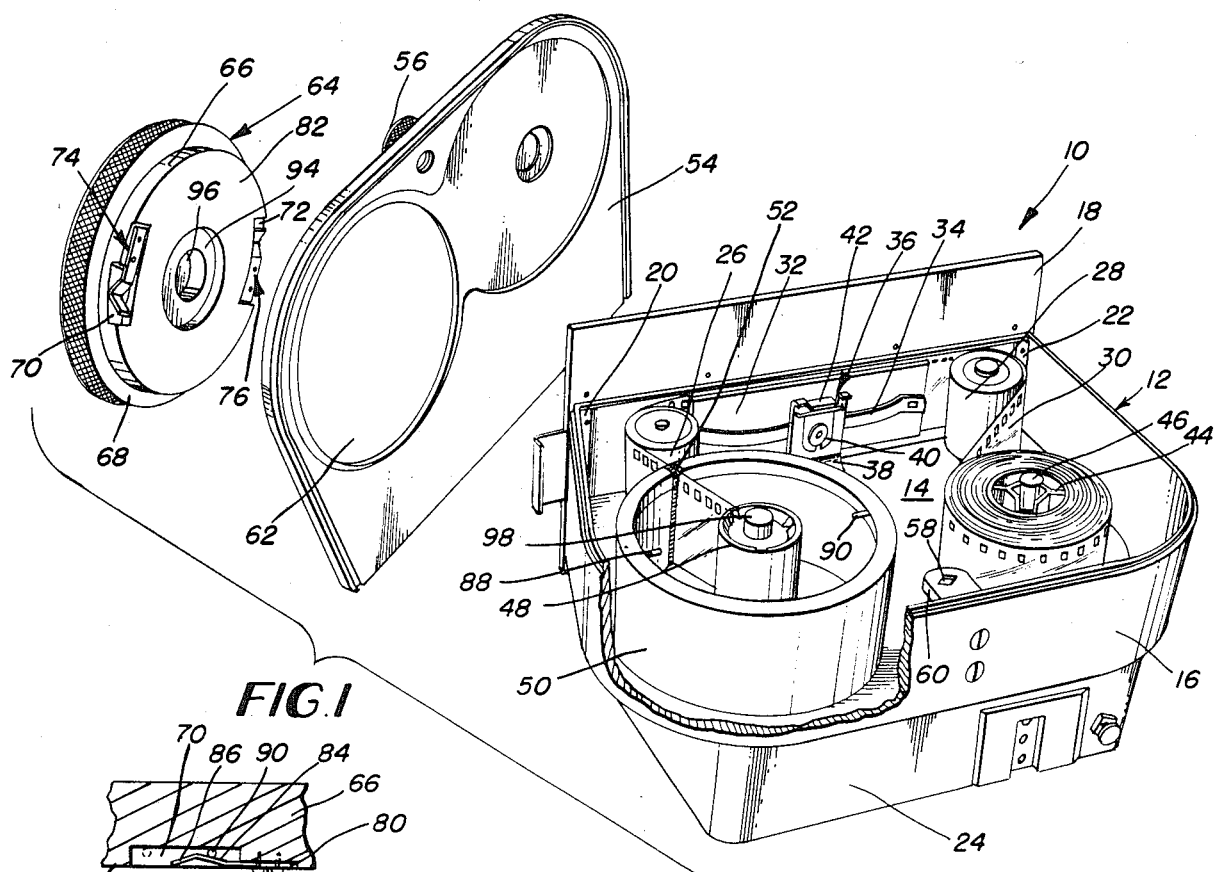
FIG. 1 is a perspective view partly broken away of a film magazine constructed in accordance with the principles of the present invention showing parts thereof disassembled and oriented for puposes of illustration.
Figure 4:
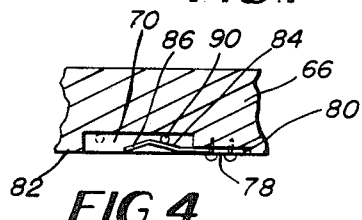
FIG. 4 is a cross sectional view taken substantially along line 4—4 of FIG. 3 illustrating a portion of the closure member rotated to a position slightly removed from the locked position.
Figure 2:
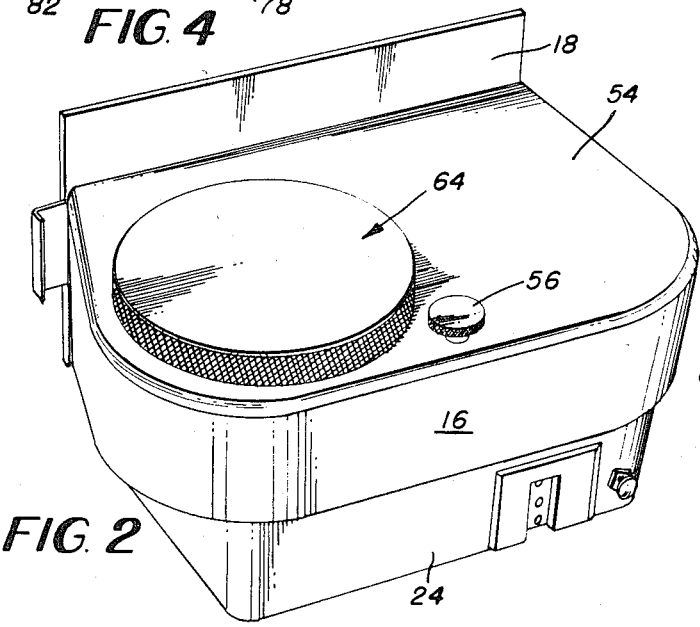
FIG. 2 is a perspective view of the magazine of FIG. 1 in the fully assembled condition.
Figure 3:
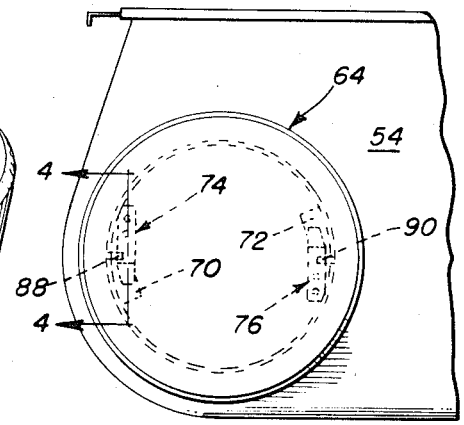
FIG. 3 is a fragmentary top view illustrating the preferred form of securing the closure member to the take-up spool housing
Figure 5:
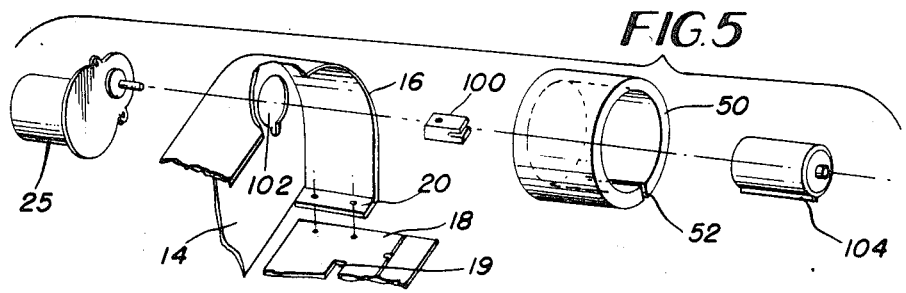
FIG. 5 is a fragmentary disasssembled exploded view of certain of the parts of the magazine.

Referring to the drawings a film magazine 10 constructed in accordance with the principles of the present invention comprises a first housing 12 having a base plate 14 to which an upstanding wall 16 is secured and which wall extends about the sides and rear of the housing to form a container, and an aperture plate 18 to which tabs 20, 22 at the front end of the wall 16 are secured. The aperture plate 18, as is conventional, has an aperture 19 to register with the shutter aperture of a camera with which the magazine is to be used and to which the magazine is to be attached by means of cooperating connecting members carried by the camera and the aperture plate. Secured to the base plate 14 at the underside thereof is a power pack 24 within which is conventionally mounted a battery or the like (not illustrated) and a standard motor 25, which are conventional and well known in the art.

At the front of the housing 12 at opposite sides thereof are guide means in the form of spaced rollers 26, 28 journally mounted on the base plate 14 and about which the film 30 is trained. Intermediate the guide rollers 26, 28 and overlaying the aperture of the aperture plate 18 is a pressure pad 32 adapted to permit the film to be fed across the aperture plate while firmly pressing the film against the plate for positioning the film for exposure by the camera. An elongated bowed leaf spring 34 biased by an adjustment member 36 is fastened at its ends to the pad 32 to apply appropriate pressure to the pad. The adjustment member 36 comprises a bifurcated upstanding support 38 having a leg fastened to the base plate 14 and carries a vertically adjustable slide 40, the slide 40 having a cam surface at the bottom and a finger tab at the top for manual gripping thereof. A spring engagable operator 42 carried by the support 38 is disposed within a slot in the slide for acting on the bowed central portion of the spring with more or less pressure determined by the vertical position of the slide.

Conventionally a long roll of film is mounted on a reel or spool 44 which is removably keyed onto a supply spindle 46 journally mounted on the base plate 14. In the prior art a similar reel and spindle would be mounted on the take-up side of the housing 12 and driven by the motor, and the housing would be enclosed by a conventional solid plate cover. Although the magazine of the present invention selectively permits this, unless the entire roll of film is to be used within a relatively short period of time such an arrangement is inconvenient and has the disadvantages heretofore noted. Consequently, the present invention permits a magazine construction in which a standard cassette 48 may be mounted in place of the conventional take-up reel to take-up the film after it has been photographically exposed by the camera and which may be removed from the magazine without exposing substantially the remainder of the film after taking as many shots as desired within the limitations of the casing of the cassette, which generally could have a capacity of up to approximately 50 frames.

Accordingly, to this end, a second housing 50 is disposed about the take-up portion of the magazine, i.e., about the roll of film to be taken-up which could be the entire roll if a conventional spool such as spool 44 or a cassette 48. Thus, the second housing 50, which comprises an upstanding wall member secured to the base plate 14, should be sized so as to be capable of holding a full roll of film on a conventional reel. Although the preferred configuration of the housing 50 is cylindrical for convenience of manufacture and efficiencies and for ease of securely closing the top thereof, the exact shape is not critical. The height of the housing, however, should be at least slightly greater than the width of the film expected to be used in the magazine. The housing 50 includes a light trap 52, i.e., a light seal, in the form of a narrow slit for receipt of the photographically exposed film and for permitting the film to enter into the central portion of the housing for winding into the cassette. The narrow slit of the light trap comprises a vertical slot in the wall of the housing 50 having the opposed edges of the slot covered with a felt-like material which engages the film and precludes passage of light from the housing through the trap.

The cover 54 of the magazine includes a peripheral groove 56 adapted for tightly fitting about the peripheral edge of the first housing 12 and may be locked thereto by a latch member 56 receivable within a cooperating catch 58 in a catch plate 60 secured to the wall 16 of the housing 12 in conventional manner. The cover 54, however, includes an access port or opening 62 of the same configuration as the second housing 50 and of a size such that the periphery of the opening is disposed on the upper surface of the housing 50 adjacent the interior wall surface thereof, or may be of a size such that it opens into the interior of the housing 50. Thus, except for the interior of the second housing the cover 54 provides a light seal for the film in the magazine when positioned and locked on the wall 16 of the magazine.

To selectively close the second housing 50 against entry of light a closure member 64 is provided, the closure member having a hub portion 66 adapted for receipt through the access opening 62 and into the interior of the second housing, and an enlarged sealing portion 68 stepped out from the hub 66 and adapted to securely abut the upper surface of the cover 54 about the access opening to prevent the light from entering into the second housing between the cover and the closure member 64. The closure member 64 may be securely locked to the second housing 52 or to the periphery of the access opening in the cover by a number of means, but it is preferred to provide a positively locking construction such as illustrated in the drawings. Thus, the hub 66 includes a pair of peripheral recesses 70, 72 oppositely spaced apart at the periphery of the hub. Disposed within each recess 70, 72 is a respective leaf spring member 74, 76, each being identical and having a shank 78 secured to the hub within a narrow groove 80 of a thickness substantially equal to that of the shank such that the shank does not protrude from the face 82 of the hub. Each spring 74, 76 includes a first portion 84 bent from the shank 78 and directed into the respective recess 70, 72 and a second portion 86 bent from the first portion toward the face 82 of the hub and terminating in a leading edge disposed at substantially the plane of the face of the hub.

To lock the closure member 64 to the second housing 50 the interior wall of the housing 50 includes a pair of opposed pins 88, 90 directed substantially radially inwardly. Each pin is disposed such that when the hub 66 of the closure member is positioned properly for closing the housing 50 the pins 88, 90 are disposed within a respective recess 70,72 adjacent the leading edge of the second portion 86 of the respective spring 74, 76. Then when the closure member is rotated the pins 88, 90 ride over the surface of the second portion 86 to urge the springs outwardly from the recesses until the closure member has rotated to a position where the springs have passed the crease between the first portion 84 and the second portion 86 of the springs. This securely locks the closure member to the second housing 50 and only upon rotation of the closure member in the opposite direction may the pins be released from the springs.

Since the sealing portion 68 of the closure member 64 abuts the upper surface of the cover 54 and the hub 66 is within the interior of the housing 50, the face 82 of the hub is recessed in the central portion, there being a larger outer recess 94 for receiving the upper portion of the cassette casing and a smaller deeper recess 96 in the center of the recess 94 for receiving the spindle 98 of the cassette 48 so as not to interfere with its rotation when driven by the motor 25 of the magazine.

To drive the cassette spindle a dog 100 may be substituted for the conventional reel spindle of the magazine, the dog spindle being bifurcated for cooperating with the central tab of conventional cassettes. When a full roll of film is going to be photographically exposed, the conventional spool spindle may be utilized. To preclude rotation of the cassette housing when the spindle is driven by the motor, the base plate may have a cut-out 102 having the same configuration as the cassette casing cross section which conventionally includes a protruding light trap lip 104. The lip will thus be disposed in the cooperating notch in the base plate and prevent rotation of the cassette housing.

In use, while in a darkened room, a large roll of film may be placed on the supply spindle 46 and the film is trained between the aperture plate 18 and the pressure pad 32 about the guide rollers 26, 28, and inserted through the light trap 52 into the interior of the second housing 50. There the film may be conventionally used with a conventional spool, or it may be attached to a tiny adhesive containing lead strip extending from the cassette and wound about the spindle of the cassette. The cover 54 is then closed about the periphery of the first housing 12 and the closure member 64 is secured to the second housing 50. If a cassette has been inserted, once the desired number of pictures have been taken, the closure member 64 is removed, and the small piece of film within the second housing 50 between the light trap and the cassette is cut separating the remainder of the roll from the film in the cassette. The cassette is then removed and may be replaced with another cassette to which the remaining piece of film within the second housing is secured in the same manner as aforesaid. The closure is then replaced and secured. Thus, only the small piece of film within the second housing is exposed to light. Consequently, the present invention provides a film magazine having the advantages which include the economy and convenience of the use of long roll film, the ability to take one to 50 shots into a cassette, daylight removal of the cassettes, and the option of reverting to take-up the film onto a long roll reel or spool.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modification which do not depart from the spirit of the invention are intended to be included within the scope of the appended claims.

Having thus set forth the nature of the invention, what is claimed herein is:

1. In a film magazine for use with a camera, said magazine comprising a housing having a base and upstanding wall means extending from the base defining a container for accommodating a web of film wound in a roll around a supply spool means, means for rotatably mounting said supply spool means in said container, take-up means for receiving the film from said supply, an aperture defined in said container intermediate said supply means and said take-up means, guide means for guiding the film from the supply means across the aperture to the take-up means, feed means for feeding and winding the film on the take-up means, and a cover for closing the container, the improvement comprising: a second housing defined by another upstanding wall means disposed within said container about said take-up means, a slit formed in said second housing defining a light trap opening from the container into said second housing for permitting film to enter the interior of said second housing for receipt by said take-up means, means defining an access port in said cover opening into said second housing to isolate entry into the second housing from the remainder of said container, and closure means for securely closing said port and selectively permitting access through said port into the second housing, whereby film on said take-up means may be removed without removal of said cover.

2. In a film magazine as recited in claim 1, wherein said take-up means comprises a cassette having a substantially cylindrical casing including a substantially extending radial lip and a rotatable spindle extending from the casing may be positioned within the second housing with said spindle extending toward said closure means, means for rotating said spindle, means in said base for precluding rotation of said casing, and means in said closure means providing clearance for said casing and said spindle.

3. In a film magazine as recited in claim 1, wherein said closure means includes a cap portion adapted to be disposed on said cover and a hub portion adapted to be received through said port and within said housing, and locking means for securing said closure means to said second housing.

4. In a film magazine as recited in claim 3, wherein said second housing and said hub portion have substantially cylindrical shapes, and said locking means comprises cooperating grasping means on said hub portion and said second housing for selectively interlocking upon rotation of said closure means in a first direction and for disengaging upon rotation of said closure means in the opposite direction.

5. In a film magazine as recited in claim 4, wherein said grasping means comprises spring means carried by said closure means, and pin means carried by said second housing.

6. In a film magazine as recited in claim 5, wherein said pin means extends radially into the interior of said second housing, and said hub portion of said closure means includes peripheral recesses disposed for receiving respective pins, said spring means comprising a leaf spring having a free end and a latching portion having a crease disposed within each recess and located such that upon rotation of said closure means in said first direction each pin abuts and urges a spring outwardly from the respective recess until the closure has rotated to a disposition wherein the spring is disposed beyond said crease of said latching portion.

7. In a film magazine as recited in claim 4, wherein said take-up means comprises a cassette having a substantially cylindrical casing including a substantially extending radial lip and a rotatable spindle extending from the casing may be positioned within the second housing with said spindle extending toward said closure means, means for rotating said spindle, means in said base for precluding rotation of said casing, and means in said closure means providing clearance for said casing and said spindle.

8. A film magazine for use with a camera, said magazine comprising a housing having a base and upstanding wall means extending from the base defining a container for accommodating a web of film, a supply spindle mounted on said base for carrying a supply spool of film, an aperture formed in said container, guide means for guiding the film from the supply spool to and from the aperture, take-up means including winding means for feeding the film from the aperture and winding the film onto a discharge spool, a second housing defined by another upstanding wall means disposed within said container about said take-up means, a slit formed in said second housing defining a light trap permitting film to enter the interior of the second housing from the aperture for receipt by said take-up means, a cover adapted for disposition on said wall means for enclosing the container, means defining an access port in said cover opening into said second housing for permitting entry to said take-up means while the remainder of said container is closed, and closure means for securely closing said port to selectively permit access through said port into said second housing while said cover is mounted on the container, whereby film on said take-up means may be removed without removal of said cover.

9. A film magazine as recited in claim 8, wherein said take-up means comprises a cassette having a substantially cylindrical casing within which film may be wound, said casing including a radial lip and a rotatable spindle extending from said casing, said take-up means including means for rotating said spindle, and means for precluding rotation of said casing.

10. A film magazine as recited in claim 8, wherein said closure means includes a cap portion adapted to be disposed on said cover and a hub portion adapted for receipt through said port and within said second housing, and locking means for securing said closure means to said second housing.

11. A film magazine as recited in claim 10, wherein said second housing and said hub portion have substantially cylindrical shapes, and said locking means comprises cooperating grasping means on said hub portion and said second housing for selectively interlocking upon rotation of said closure means in a first direction and for disengaging upon rotation of said closure means in the opposite direction.

12. A film magazine as recited in claim 11, wherein said grasping means comprises spring means carried by said closure means and pin means carried by said second housing.

13. A film magazine as recited in claim 12, wherein said pin means extends radially into the interior of said second housing, and said hub portion of said closure means includes peripheral recesses disposed for receiving said pins, said spring means comprising a leaf spring having a free end and a latching portion having a crease disposed within each recess and located such that upon rotation of said closure means in said first direction each pin abuts and urges a spring outwardly from the respective recess until the closure means has rotated to a disposition wherein the spring is disposed beyond said crease of said latching portion.

14. A film magazine as recited in claim 9, wherein said closure means includes a cap portion adapted to be disposed on said cover and a hub portion adapted for receipt through said port and within said second housing, and locking means for securing said closure means to said second housing.

15. A film magazine as recited in claim 14, wherein said second housing and said hub portion have substantially cylindrical shapes, and said locking means comprises cooperating grasping means on said hub portion and said second housing for selectively interlocking upon rotation of said closure means in a first direction and for disengaging upon rotation of said closure means in the opposite direction.

16. A film magazine as recited in claim 15, wherein said grasping means comprises spring means carried by said closure means and pin means carried by said second housing.

17. A film magazine as recited in claim 16, wherein said pin means extends radially into the interior of said second housing, and said hub portion of said closure means includes peripheral recesses disposed for receiving said pins, said spring means comprising a leaf spring having a free end and a latching portion having a crease disposed within each recess and located such that upon rotation of said closure means in said first direction each pin abuts and urges a spring outwardly from the respective recess until the closure means has rotated to a disposition wherein the spring is disposed beyond said crease of said latching portion.

* * * * *